United States Patent
Raassina et al.

(10) Patent No.: US 11,274,019 B2
(45) Date of Patent: Mar. 15, 2022

(54) WIRELESS POWER TRANSFER ARRANGEMENT FOR AN ELEVATOR CAR AND AN ELEVATOR

(71) Applicant: Kone Corporation, Helsinki (FI)

(72) Inventors: Pasi Raassina, Helsinki (FI); Seppo Suur-Askola, Helsinki (FI); Ilya Petrov, Helsinki (FI); Pekka Perunka, Helsinki (FI)

(73) Assignee: Kone Corporation, Helsinki (FI)

( * ) Notice: Subject to any disclaimer, the term of this patent is extended or adjusted under 35 U.S.C. 154(b) by 954 days.

(21) Appl. No.: 15/969,989

(22) Filed: May 3, 2018

(65) Prior Publication Data

US 2018/0334362 A1 Nov. 22, 2018

(30) Foreign Application Priority Data

May 17, 2017 (EP) .................................... 17171579

(51) Int. Cl.
  *B66B 11/04* (2006.01)
  *B66B 1/30* (2006.01)
  (Continued)

(52) U.S. Cl.
  CPC ............ *B66B 11/0407* (2013.01); *B66B 1/30* (2013.01); *B66B 1/308* (2013.01);
  (Continued)

(58) Field of Classification Search
  CPC ....... B66B 11/0407; B66B 1/30; B66B 1/308; B66B 11/0226; B66B 11/04; H02J 50/10; H02J 5/005; H02J 7/025
  See application file for complete search history.

(56) References Cited

U.S. PATENT DOCUMENTS 6,412,604 B1 * 7/2002 Schuster ............. B66B 11/0407
  187/290
8,847,436 B2 * 9/2014 Maxik .................... H05B 47/10
  307/104
(Continued)

FOREIGN PATENT DOCUMENTS

JP      H05338960 A     12/1993
JP      2002003096 A     1/2002
WO      WO-2005005299 A1  1/2005

OTHER PUBLICATIONS

European Search Report for European Patent Application No. 17171579 dated Nov. 24, 2017.

*Primary Examiner* — Jeffrey Donels
(74) *Attorney, Agent, or Firm* — Harness, Dickey & Pierce, P.L.C.

(57) ABSTRACT

A wireless power transfer arrangement for an elevator car of an elevator is presented. The wireless power transfer arrangement comprises primary winding units distantly arranged with respect to each other at first positions of an elevator shaft along which the elevator car is configured to be moved, at least one secondary winding unit arranged to the elevator car. Each one of the primary winding units and the at least one secondary winding unit are arranged so that there is a gap between said winding units for enabling movement of the secondary winding unit with respect to the primary winding units and for establishing an inductive coupling between said winding units whenever said winding units are arranged to face each other at one of the first positions.

13 Claims, 7 Drawing Sheets

(51) Int. Cl.
*H02J 50/10* (2016.01)
*B66B 11/02* (2006.01)
*H02J 5/00* (2016.01)

(52) U.S. Cl.
CPC .......... *B66B 11/0226* (2013.01); *H02J 5/005* (2013.01); *H02J 50/10* (2016.02)

(56) References Cited

U.S. PATENT DOCUMENTS

| | | | |
|---|---|---|---|
| 9,837,860 B2* | 12/2017 | McCarthy | H02J 50/40 |
| 2006/0207837 A1* | 9/2006 | Zepke | B66B 1/462 |
| | | | 187/392 |
| 2010/0294599 A1* | 11/2010 | Zepke | B66B 3/00 |
| | | | 187/325 |
| 2017/0057779 A1* | 3/2017 | Dwari | B66B 11/0407 |
| 2017/0057791 A1* | 3/2017 | Hsu | B66B 11/0407 |
| 2019/0193993 A1* | 6/2019 | Elomaa | B66B 5/0025 |
| 2020/0195047 A1* | 6/2020 | Manes | B66B 7/00 |

* cited by examiner

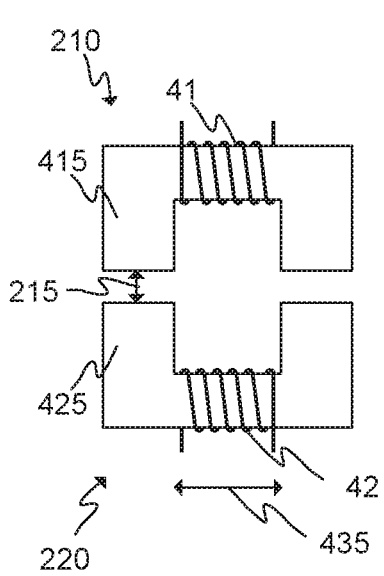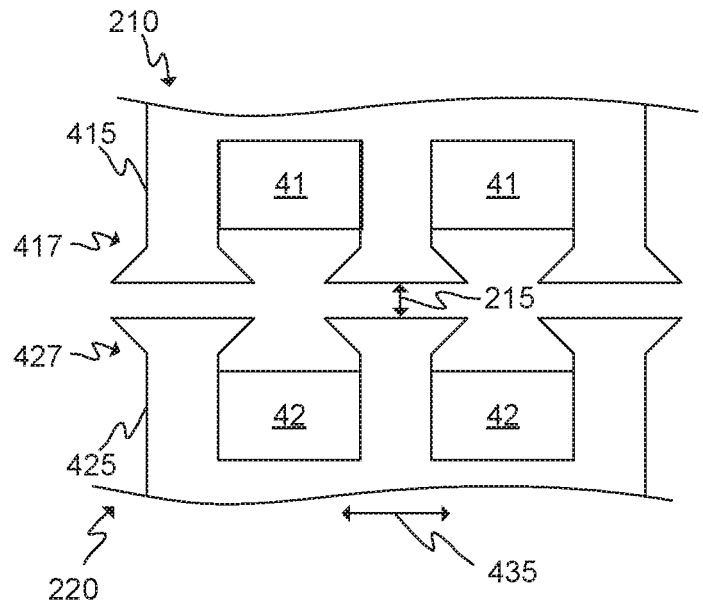
FIG. 4  FIG. 5
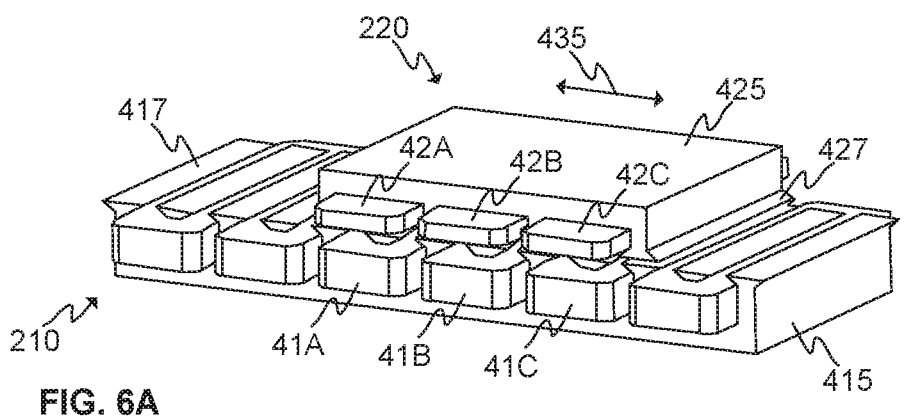
FIG. 6A
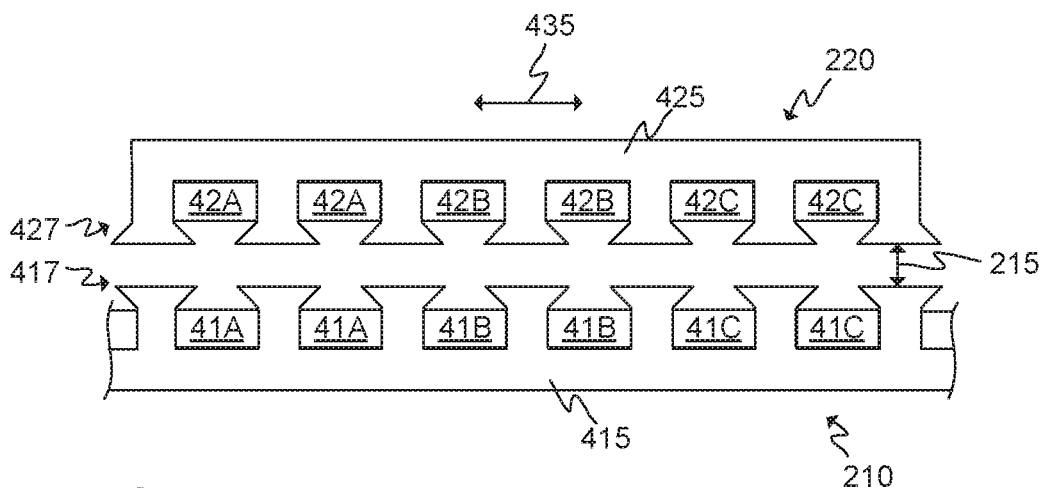
FIG. 6B

WIRELESS POWER TRANSFER ARRANGEMENT FOR AN ELEVATOR CAR AND AN ELEVATOR

This application claims priority to European Patent Application No. EP171715790 filed on May 17, 2017, the entire contents of which are incorporated herein by reference

TECHNICAL FIELD

The invention concerns in general the technical field of elevators. The invention concerns especially, however, not exclusively, wireless power transfer arrangement of an elevator car of elevators.

BACKGROUND

Elevators have been traditionally operated by utilizing a hoisting motor in connection with a hoisting rope or ropes for moving the elevator car within or along the hoistway or an elevator shaft, and a wired power line or lines, such as electrical cables, routed to the elevator car for providing electrical power to the electrical equipment arranged to the elevator car.

At the present time, elevators are often to be installed in targets in which the travel height of the elevator may exceed the mechanical strength of the ropes and/or electrical cables of conventional elevators, such as in case of very high buildings, and/or the swaying or bending of the building due to wind, for instance, causes challenges for the operation of the elevators.

Furthermore, multi-car elevators, that is, elevators having more than one elevator car operating in their hoistway or shaft, will face similar challenges with respect to the electrical cabling. Electrical power must, thus be provided to the elevator car by other means.

There is thus a need to develop elevators, especially for very high buildings, for overcoming the challenges related to the height of the hoistway or shaft which may be too high for the ropes and/or cables to withstand their own weight and/or the weight of the elevator car. There is also a need to develop the electrical power supply of the multicar elevators, because with respect to conventional elevators, the hoistway or shaft is not empty for the rope(s) and cable(s) due to the multiple elevator cars residing in the elevator shaft of the elevator.

SUMMARY

An objective of the present invention is to provide a wireless power transfer arrangement for an elevator car of an elevator and an elevator utilizing wireless power transfer arrangements. Another objective of the present invention is that the wireless power transfer arrangement and the elevator at least alleviate the problems related to known attempts concerning the electrical cables running within the elevator shaft and providing power to the elevator car.

The objectives of the invention are reached by a wireless power transfer arrangement and an elevator as defined by the respective independent claims.

According to a first aspect, a wireless power transfer arrangement for an elevator car of an elevator is provided. The wireless power transfer arrangement comprises primary winding units distantly arranged with respect to each other at first positions of an elevator shaft along which the elevator car is configured to be moved, wherein each primary winding unit comprises at least a primary winding. "Distantly with respect to each other" refers herein to the primary windings units which are separated from each other by a distance which entails that they form a discontinuous set of windings in the elevator shaft. The primary windings units may, preferably, also be galvanically separated. The wireless power transfer arrangement further comprises at least one secondary winding unit arranged to the elevator car, wherein each of the at least one secondary winding unit comprises at least a secondary winding. Furthermore, each one of the primary winding units and the at least one secondary winding unit are arranged so that there is a gap between said winding units for enabling movement of the at least one secondary winding unit with respect to the primary winding units and for establishing an inductive coupling between the secondary winding and the primary winding whenever one of the at least one secondary winding unit and one of the primary winding units comprising said windings are arranged to face each other at one of the first positions at which said one of the primary winding units is arranged, that is, for example, at an intended charging position.

"Winding" is used herein to mean an entity which may comprise, for example, a coil or a set of coils. The coils of a winding may, for example, be arranged to form a single-phase or a three-phase winding, and may thus be electrically connected in series or in parallel or be galvanically separated, for instance.

The elevator car may comprise a first energy storage, such as a battery or batteries, mounted to the elevator car and coupled to the secondary winding unit for providing electrical power to the electrical equipment and appliances comprised in the elevator car.

The primary windings units may comprise ferromagnetic teeth, around at least one of which the primary winding is wound.

The at least one secondary winding unit may comprise ferromagnetic teeth, around at least one of which the secondary winding is wound.

The primary or the secondary windings, or both, may be overlapping windings. This means that the coils of the primary winding may overlap with each other and the coils of the secondary winding may overlap each other.

The primary windings may be arranged to teeth of a stator comprised in a stator beam of an electric linear motor of the elevator.

The secondary winding may be arranged to teeth of a mover, that is, to teeth of an armature of the mover of an electric linear motor of the elevator.

The distantly arranged primary winding units may be galvanically separated from each other, that is, there is no direct conduction path of the current between the primary winding units. The distantly arranged primary winding units may have a distance of at least one meter between two consecutive primary winding units.

Each one of the primary winding units may comprise an energy storage, that is, a second energy storage, for minimizing instant power and current peaks. Whenever the at least one secondary winding unit is at a first position facing a primary winding unit, wireless power transfer via the inductive coupling between the secondary and the primary winding is possible. "The instant power and current peaks" refer herein to situations where the electrical power for the wireless power transfer is drawn from the main power supply of the elevator. The second energy storages may then be utilized such that at least part of the power is drawn from the second energy storage thus reducing the power taken from the main power supply by the primary winding unit. Furthermore, the second energy storage may be charged with low power during the times when the at least one secondary winding unit is not at the corresponding first position.

There may also be one second energy storage coupled to several primary winding units.

According to one or more embodiments, the primary winding unit comprises a switching unit coupled to the primary winding, the switching unit having an input for receiving a power supply control signal from an elevator control unit, and the switching unit configured to provide AC (alternating current) voltage to the primary winding on the basis of the power supply control signal.

According to a second aspect, an elevator comprising an elevator shaft along which an elevator car of the elevator is configured to be moved is provided. The elevator comprises at least two primary winding units arranged to at least two distantly arranged first positions of the elevator shaft and at least one secondary winding unit arranged to the elevator car. Each one of the primary winding units comprises a primary winding and the at least one secondary winding unit comprises a secondary winding. Said winding units are arranged so that there is a gap between them for enabling the movement of the at least one secondary winding unit with respect to the primary winding units during moving of the elevator car. Said winding units are adapted for forming an inductive coupling between said windings for wireless electrical power transfer between said windings whenever the elevator car is arranged at one of the at least one first positions.

According to one or more embodiments, the elevator may comprise
- an elevator control unit for controlling elevator car movement;
- a position sensor adapted to sense position of the elevator car, the position sensor being connected to the elevator control unit;
- wherein the elevator control unit is configured to form a power supply control signal when the position sensor indicates that elevator car has arrived or is about to arrive to an intended charging position;
- and wherein the primary winding unit may comprise a switching unit coupled to the primary winding of the primary winding unit, the switching unit having an input for receiving a power supply control signal from the elevator control unit,
- and wherein the switching unit is configured to provide AC voltage to the primary winding on the basis of the power supply control signal.

The switching unit may comprise one or more controllable switches, such as relay(s), IGBT (Insulated Gate Bipolar Transistor) transistor(s), MOSFET (Metal-oxide-semiconductor field-effect transistor) transistor(s) or corresponding.

According to an embodiment, the intended charging position may be recorded to the memory of elevator control unit. The first energy storage may comprise determination means for determining charging status of the first energy storage. The first energy storage may be connected to the elevator control unit via a data link, preferably a wireless link or data wire of the travelling cable, for indicating charging need of the first energy storage. The elevator control unit may be configured to command elevator car to stop to the intended charging position responsive to receiving a charging need of the first energy storage.

The primary winding units may be galvanically separated with respect to each other. The primary winding units may have a distance of at least one meter between two consecutive primary winding units.

The primary or secondary windings, or both, may be overlapping windings.

The primary windings may be arranged to a stator comprised in a stator beam of an electric linear motor of the elevator.

The secondary winding may be arranged to a mover of an electric linear motor of the elevator.

Each one of the primary winding units comprises a second energy storage for minimizing instant power and current peaks. There may also be one second energy storage coupled to several primary winding units.

The wireless power transfer arrangement provides advantages over known solutions such that the electrical power can be provided wirelessly to the elevator car at the first positions of the elevator shaft and there is no need to have a galvanic coupling, that is a direct conduction path of the current, for providing electrical power along the whole length of the elevator shaft.

Various other advantages will become clear to a skilled person based on the following detailed description.

The expression "a plurality of" refers herein to any positive integer starting from two, e.g. to two, three, or four.

The terms "first" and "second" do not denote any order, quantity, or importance, but rather are used to distinguish one element from another.

The exemplary embodiments of the present invention presented herein are not to be interpreted to pose limitations to the applicability of the appended claims. The verb "to comprise" is used herein as an open limitation that does not exclude the existence of also un-recited features. The features recited in depending claims are mutually freely combinable unless otherwise explicitly stated.

The novel features which are considered as characteristic of the present invention are set forth in particular in the appended claims. The present invention itself, however, both as to its construction and its method of operation, together with additional objectives and advantages thereof, will be best understood from the following description of specific embodiments when read in connection with the accompanying drawings.

BRIEF DESCRIPTION OF FIGURES

The embodiments of the present invention are illustrated by way of example, and not by way of limitation, in the figures of the accompanying drawings.

FIG. 4 illustrates schematically a wireless power transfer arrangement according to an embodiment of the present invention.

FIG. 5 illustrates schematically a wireless power transfer arrangement according to an embodiment of the present invention.

FIGS. 6A and 6B illustrate schematically a wireless power transfer arrangement according to an embodiment of the present invention.

DESCRIPTION OF SOME EMBODIMENTS

Figure 1:
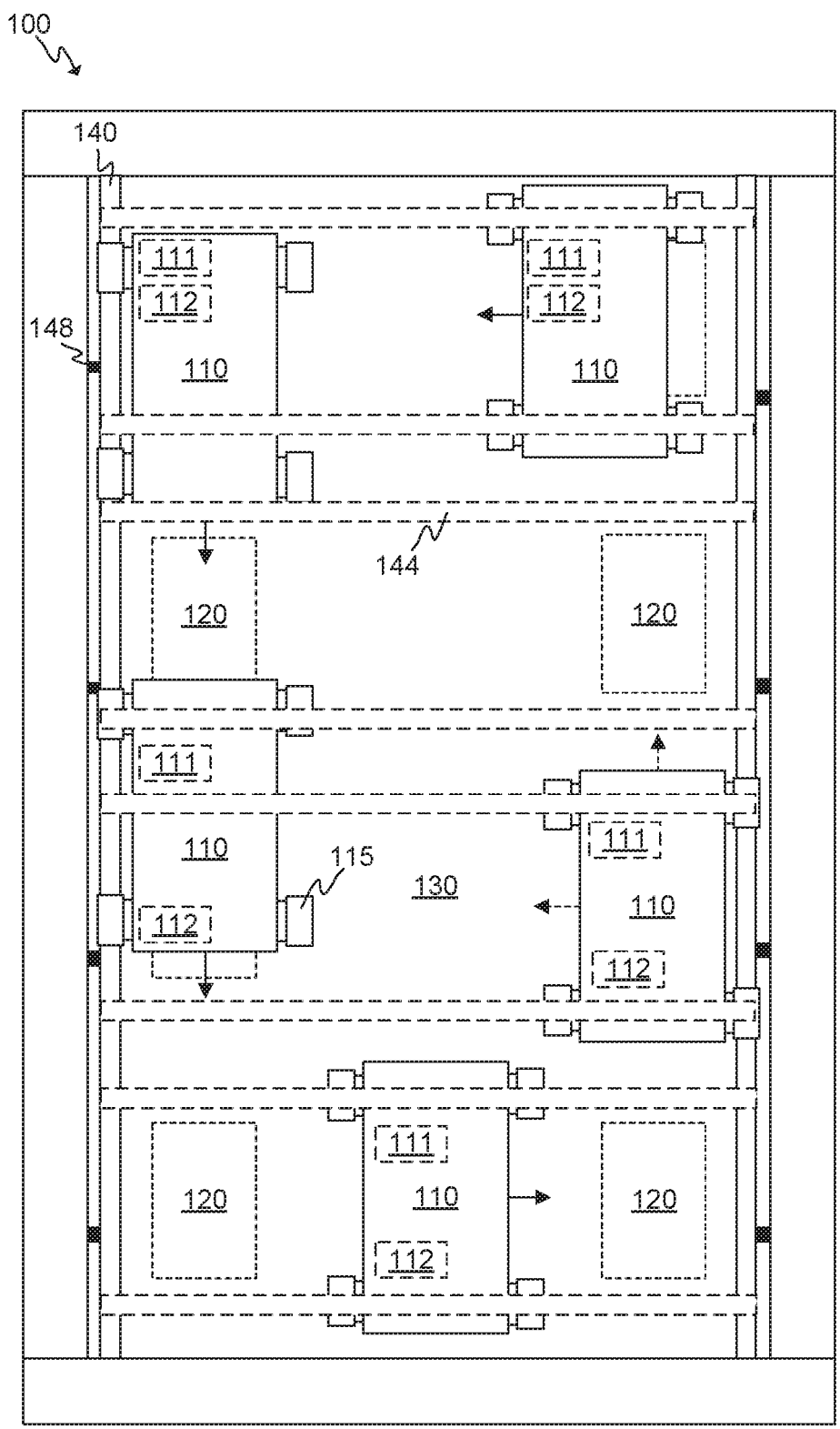
FIG. 1 illustrates schematically an elevator according to an embodiment of the present invention.

FIG. 1 illustrates schematically an elevator 100 according to an embodiment of the present invention. The elevator 100 may comprise at least one or a plurality of elevator cars 110 moving in the hoistway 130 or the elevator shaft 130. The elevator car(s) 110 may comprise a first electrical drive 111, such as a frequency converter or an inverter, and/or a first energy storage 112 such as a battery or batteries, which are shown with dashed lines indicating the optionality of the feature. The first electrical drive 111 may be utilized for operating a mover 240 arranged to the elevator car 110 for moving the car 110 along the elevator shaft 130 in case of an electric linear motor based elevator 100. There may also be other electrically operated equipment in the elevator car 110 such as lighting, doors, user interface, emergency rescue equipment, etc. The first electrical drive 111 or a further electrical drive, such as an inverter or a rectifier, may be utilized for operating one or several of said other equipment of the elevator car 110. The first energy storage 112 may, preferably, be electrically coupled to the first electrical drive 111, for example, to the intermediate circuit of the drive 111, for providing electrical power to the first electrical drive 111 and/or for storing electrical energy provided by the first electrical drive 111 or a further electrical drive or other electrical power source. The first energy storage 112 may, advantageously, be used for providing electrical power to the electrical equipment comprised in the elevator car 110 when the elevator car 110 is at positions other than the first positions 250 (described in more detail with respect to FIGS. 2A-2D, for example) of the elevator shaft 130.

There are preferably at least two landing floors 120 comprised in the elevator 100. The landing floors 120 may comprise landing floor doors in the elevator shaft 130. There may also be doors comprised in the elevator car 110. Although shown in FIG. 1 that there are two horizontally separated sets, or "columns", of landing floors 120, there could as well be only one column as in conventional elevators or more than two, for example, three. It is to be noted that although FIG. 1 illustrates schematically a multi-car elevator, according to an embodiment of the present invention, the elevator 100 may also be a conventional elevator having an elevator shaft 130 by a sufficiently strong hoisting rope in connection with a hoisting motor in which only one elevator car 110 is configured to be moved and serve landing floors 120.

Regarding the elevator shaft 130, it may be such as defining substantially closed volume in which the elevator car 110 is adapted and configured to be moved. The walls may be, for example, of concrete, metal or at least partly of glass, or any combination thereof. The elevator shaft 130 herein refers basically to any structure or pathway along which the elevator car 110 is configured to be moved.

As can be seen in FIG. 1 with respect to the multi-car elevator 100, the elevator car 110 or cars 110 may be moved along the elevator shaft 130 vertically and/or horizontally depending on the direction of stator beams 140, 144. According to embodiments similar to one in FIG. 1 in this respect, the elevator car 110 or cars 110 may be configured to be moved along a number of vertical 140 and/or horizontal 144 stator beams, for example, two beams such as in FIG. 1. The stator beams 140, 144 may, preferably, be part of an electric linear motor of the elevator 100 utilized to move the elevator car 110 or cars 110 in the elevator shaft 130. The stator beams 140, 144 may, preferably, be arranged in fixed manner, that is, stationary with respect to the elevator shaft 130, for example, to a wall of the shaft by fastening elements 148.

Figure 2A:
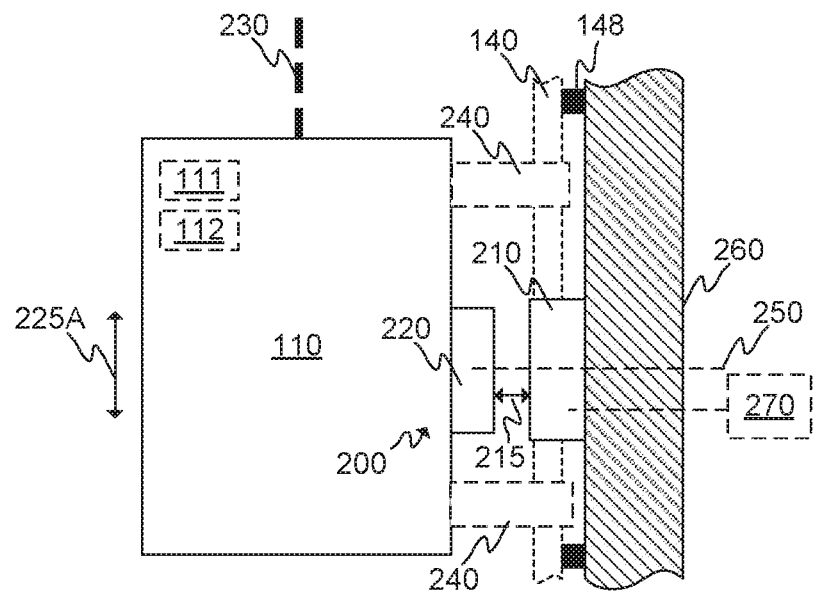
FIGS. 2A and 2B illustrate schematically an elevator car according to an embodiment of the present invention.

FIG. 2A illustrates schematically an embodiment of the present invention. The elevator car 110 is illustrated by a sectional side view. The elevator car 110 may be configured to be moved by a hoisting rope 230 in connection with an electric motor or by an electrical linear motor comprising at least one mover 240 and, as shown in FIG. 2A, a stator comprised in a stator beam 140, in this case, a vertical stator beam 140. In case of an electric linear motor, the at least one mover 240 is configured to be in electromagnetic engagement with a stator in the stator beam 140 of the linear electric linear motor comprised for moving the elevator car 110 in the shaft 130. There may be one or, preferably, several stators comprised in a stator beam 140. The hoisting rope 230 and the electric linear motor have been shown in FIGS. 2A and 2B by using dashed lines indicating that they are optional features such that not both of them are necessarily required to be utilized simultaneously according to an embodiment of the present invention.

The stator beam 140 may be attached to the elevator shaft 130, for example, to a wall 260 thereof, by fastening elements 148. One or several stators may be comprised in a stator beam 140. The elevator 100 further comprises at least one primary winding unit 210 arranged in fixed manner to the elevator shaft 130, such as to a wall 260 or structure of the elevator shaft 130 at a first position 250. The elevator car 110 further comprises at least one secondary winding unit 220 attached to the elevator car 110. There may be only one or several secondary winding units 220 in each elevator car 110, if many. The primary 210 and the secondary 220 winding units are arranged so that there is a gap 215 between them, that is, an empty space, for enabling the movement of the at least one secondary winding unit 220 with respect to the at least one primary winding unit 210 during moving of the elevator car 110. Said winding units 210, 220 are adapted for forming an inductive coupling between said windings units 210, 220 for wireless electrical power transfer between said winding units 210, 220 whenever the elevator car 130 is positioned such as said windings units 210, 220 are at corresponding positions, that is, at a first position 250 in the direction of the movement of the elevator car 110, in this particular case, the vertical direction 225A.

There may, preferably, be several first positions 250 arranged to the elevator shaft 130, thus serving as power transfer positions or "charging positions" for the elevator car 110. According to various embodiments of the present invention, the first positions 250 are separated by a distance from each other so that the wireless power transfer to the elevator car 110 is possible only in certain positions with respect to the path along which the elevator car 110 is configured to be moved with the elevator shaft 130. The first positions 250 may be arranged, for example, at every landing floor 120 and/or at the lowest and highest positions of the elevator car 110 in the vertical direction 225A. In case of multi-car elevators, the elevator car 110 may be configured to be moved at least in two perpendicular directions, or at least two directions separated with an angle differing from 0 or 180 degrees, and the first positions 250, and thus the first windings units 210, may be arranged at the corner positions in which the elevator car 110 changes direction, or any other position at which the elevator car 110 is configured to be stopped, for example, by brakes.

The windings units 210, 220 comprise at least windings, that is, a primary winding of the primary winding unit 210 and a secondary winding of the secondary winding unit 220. The windings unit 210, 220 may, preferably, comprise coil or coils, magnetic cores, such as at least of ferromagnetic material, for forming a magnetic circuit and guiding the magnetic field between the primary and secondary windings when the winding units 210, 220 are at the corresponding positions with respect to each other, such as shown in FIG. 2A. There may also be a second energy storage 270 arranged in electrical coupling with the primary winding unit 210. The second energy storages 270 may be, for example, a battery or batteries or capacitors. The second energy storages 270 may operate as "buffers" at the first positions or the "charging stations" to minimize instant power and current peaks due to high power transfer at the charging stations.

The wireless electrical power transfer is possible whenever the elevator car 110 is at the corresponding position, that is, in which the secondary 220 and primary 210 winding units are at the corresponding positions, that is, at the first position 250, for establishing a proper inductive coupling, for example, by a magnetic circuit having ferromagnetic material as magnetic cores. The gap 215 may in that case be configured to reside between the magnetic core of the secondary winding unit 220 and the magnetic core of the primary winding unit 210, such as between magnetic teeth around which the windings or coils have been wound or coiled.

Figure 2B:
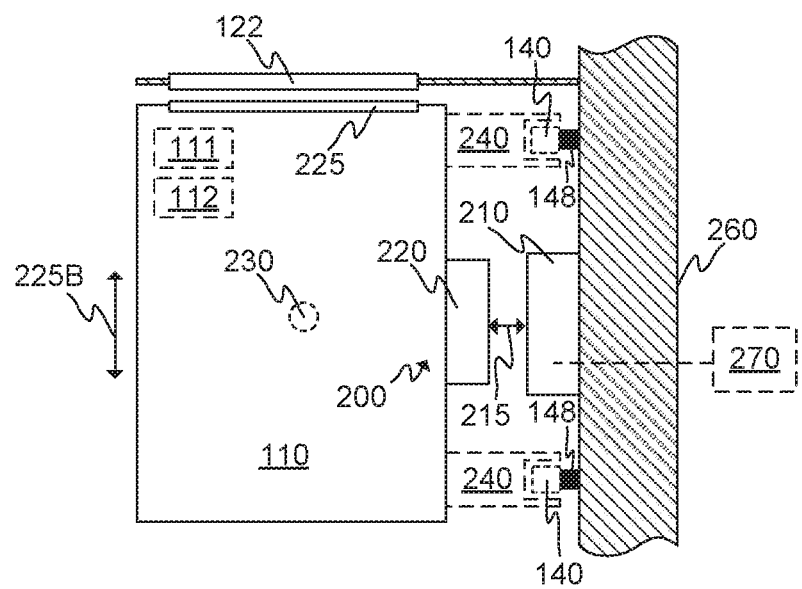

FIG. 2B illustrates schematically an embodiment of the present invention. The elevator car 110 is illustrated by a sectional view from above. As can be seen, both the elevator car 110 and the landing floor 120 may comprise a door 122, 225. The elevator car 110 may be configured to be moved by a hoisting rope 230 in connection with an electric motor or by an electrical linear motor comprising at least one mover 240 and, and as shown in FIG. 2B, a vertical stator beam 140. The at least one mover 240 is configured to be in electromagnetic engagement with a stator of the stator beam 140 in order to be moved along the stator beam 140 for moving the elevator car 110 in the shaft 130. The hoisting rope 230 and the electric linear motor have been shown by using dashed lines indicating that they are optional features such that not both of them are necessarily required according to an embodiment of the present invention.

As can be seen in FIG. 2B, the primary 210 and the secondary 220 windings are advantageously arranged to align with respect to each other in the direction perpendicular to the direction of the movement of the elevator car 110, that is, in this case relative to the horizontal direction 225B. This way the wireless power transfer is readily available whenever the elevator car 110 is at a first position 250 with respect to the vertical direction 225A because said winding units 210, 220 are always at corresponding positions in the horizontal direction.

The mover 240 according to the embodiment in FIG. 2B is U-shaped but may also be, for example, C-shaped, in which case the stators may be arranged on every side of the stator beam 140 for establishing an electromagnetic engagement between the mover 240 and the stators of the stator beam 140 for moving the elevator car along the stator beam 140.

Figure 2C:
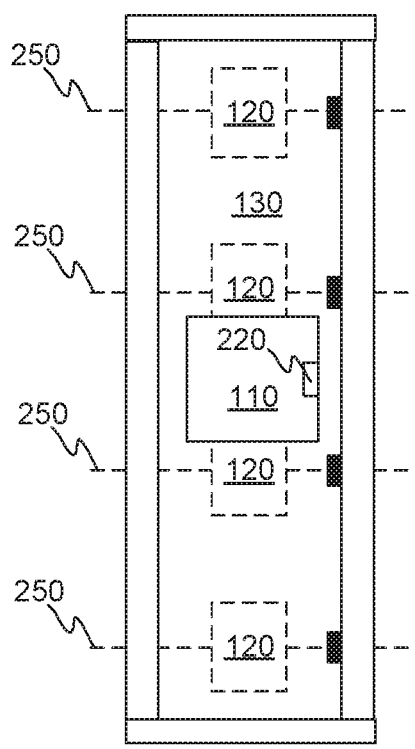
FIGS. 2C and 2D illustrate schematically elevators according to an embodiment of the present invention.
Figure 2D:
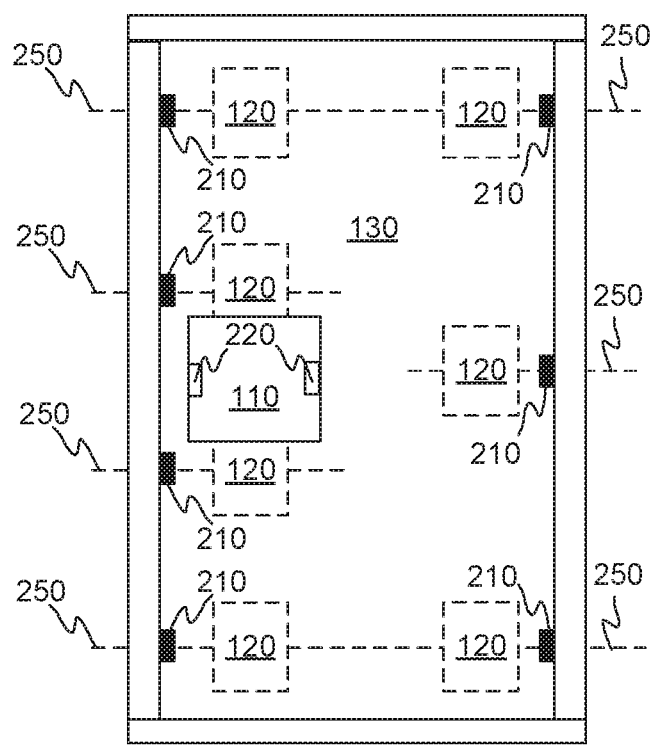

FIGS. 2C and 2D further illustrate highly schematically the elevator 100 according to various embodiments of the present invention. One or several elevator cars 110 may be utilized in the elevator shaft 130 for serving the landing floors 120. The elevator car 110 or cars 110 may be moved by a hoisting rope 230 or an electric linear motor comprising a mover 240 and a stator. The primary winding units 210 may, preferably, be arranged distantly with respect to each other at the first positions 250, or power transfer 250 or charging positions 250. "Distantly with respect to each other" refers herein to the fact that the primary windings units 210 are separated from each other by a distance which entails that they form a discontinuous set of windings in the elevator shaft 130, thus forming "charging stations" within the elevator shaft 130. The primary windings units 250 may, preferably, also be galvanically separated, and thus, controlled by separate electrical drives. The distance between two consecutive primary winding units 210 may be at least such that the primary winding units 210 themselves cannot be utilized for moving the elevator car 110 or continuously provide electrical power to the elevator car 110 along the whole length of the elevator shaft 130. The distance between two consecutive primary winding units 210 may be at least one meter, for example. The benefit of arranging the primary windings units 210 at first positions 250, advantageously, at such positions where the elevator car 110 stops in during normal operation while serving landing floors 120 in normal manner, enables the wireless power transfer between the primary 210 and secondary windings 220 units whenever the elevator car 110 has stopped at a first position 250. There may also be first positions 250 in the highest and lowest point of the elevator shaft 130 in the direction of the movement of the elevator car 110. The power wirelessly transferred may then be directly utilized in the elevator car 110 or stored into the energy storage 112 of the elevator car 110, for instance.

According to various embodiments of the present invention utilizing an electric linear motor, the hoisting rope(s) 230 have been omitted as well as any electrical cables running within the elevator shaft 130 for providing electrical power to the elevator car 110. The electrical power is provided wirelessly at first positions 250 by transferring electrical power which is then stored to the first energy storage 112 of the elevator car 110. There may, however, also be other positions and means for supplying power to the first energy storage 112 of the elevator car 110 in addition to the wireless power transfer at the first positions 250.

Figure 3:
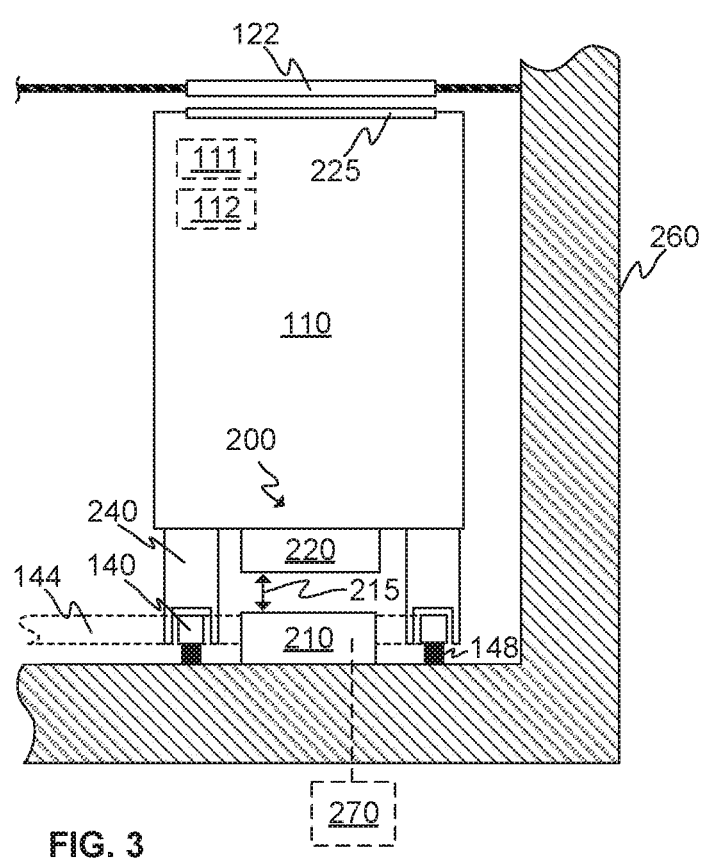
FIG. 3 illustrates schematically an elevator car according to an embodiment of the present invention.

FIG. 3 illustrates schematically the elevator car 110 according to an embodiment of the present invention. The elevator car 110 is configured to be moved by an electric linear motor comprising two movers 240 arranged to the back of the elevator car 110. The elevator 100 in FIG. 3 comprises both vertical 140 and horizontal 144 stator beams. The primary 210 and secondary 220 winding units are arranged to the back of the elevator car 110. However, it is to be understood that in various embodiments the locations of the primary 210 and secondary 220 winding units are not fixed with respect to the position of the parts of the electric linear motor but may be arranged to different side of the elevator car 110 with respect to the parts of the linear motor.

FIG. 4 illustrates schematically a wireless energy transfer arrangement according to an embodiment the present invention. The primary winding unit 210 comprises a primary winding 41, such as a coil, and primary magnetic core 415.

The secondary winding unit 220 comprises a secondary winding 42, such as a coil, and second magnetic core 425. There is a gap 215 between the magnetic cores 415, 425 which enables the movement of the secondary winding unit 220 relative to the primary winding unit 210 and is also such that said winding units 210, 220 form a proper magnetic circuit, thus inductively coupling said windings 41, 42 to each other whenever the winding units 210, 220 are at corresponding positions. The movement of the secondary winding unit 220 with respect to the primary winding unit 210 is illustrated in FIG. 4 by a two-headed arrow 435.

FIG. 5 illustrates schematically a wireless energy transfer arrangement according to an embodiment the present invention. The primary winding unit 210 comprises a primary winding 410 and primary magnetic core 415. The primary magnetic core 415 comprises primary teeth 417, preferably, of the same ferromagnetic material as the magnetic core of the primary winding unit 210. The primary winding 41 may be wound around such a primary tooth 417 as shown in FIG. 5 in which there is only one primary winding 41 shown as a sectional side view. The secondary winding unit 220 comprises a secondary winding 42 and secondary magnetic core 425. The secondary magnetic core 425 comprises secondary teeth 427, preferably, of the same ferromagnetic material as the magnetic core of the secondary winding unit 210. The secondary winding 42 may be wound around such a secondary tooth 247 as shown in FIG. 5 in which there is only one secondary winding 41 shown as a sectional side view.

According to various embodiments of the present invention, there may be one or several primary windings and one or several secondary windings comprised in the primary winding unit 210 and the secondary winding unit 220, respectively. There is a gap 215 between the magnetic cores 415, 425 which enables the movement of the secondary winding unit 220 relative to the primary winding unit 210 and is also such that said winding units 210, 220 form a proper magnetic circuit, thus inductively coupling said windings 41, 42 to each other whenever the winding units 210, 220 are at corresponding positions. At the corresponding positions, that is, at the first positions 250, the gap 215 is, advantageously, between two teeth: a primary 417 and a secondary 427. The movement of the secondary winding unit 220 with respect to the primary winding unit 210 is illustrated in FIG. 5 by a two-headed arrow 435.

When the primary 210 and the secondary 220 winding units are at the corresponding positions and the inductive coupling is formed by exciting at least one of the primary 210 and secondary 220 windings, an air gap comprised in the magnetic circuit thus formed has at least the length of two gaps 215. The length of each one of the gaps 215 may, preferably, be the same with respect to other gaps, however, they may also vary between different windings 41, 42 or teeth 417, 427.

FIG. 6A illustrates schematically a wireless power transfer arrangement according to an embodiment of the present invention from a perspective view. FIG. 6B illustrates the same embodiment as in FIG. 6A from a sectional side view. Each one of the primary windings 41A-41C is wound around a primary magnetic tooth 417. There is a gap 215 between the primary winding unit 210 and the secondary winding unit 220 in order to enable the movement of the secondary winding unit 220 with respect to the primary winding unit 210 as shown with the two-headed arrow 435. According to the embodiment illustrated in FIGS. 6A and 6B, the windings are so called non-overlapping windings. Each windings, primary or secondary, has been wound such there is only one winding around one magnetic tooth 417, 427.

Figure 7A:
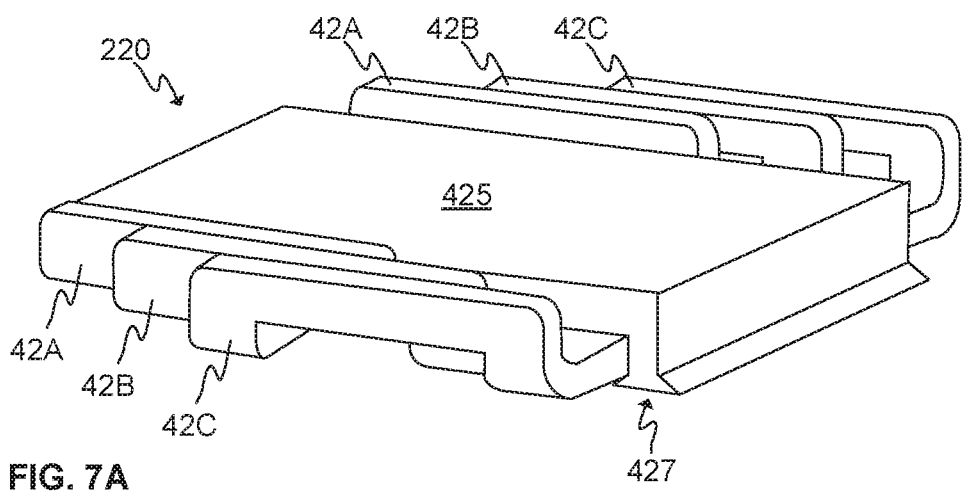
FIGS. 7A and 7B illustrate schematically a wireless power transfer arrangement according to an embodiment of the present invention.
Figure 7B:
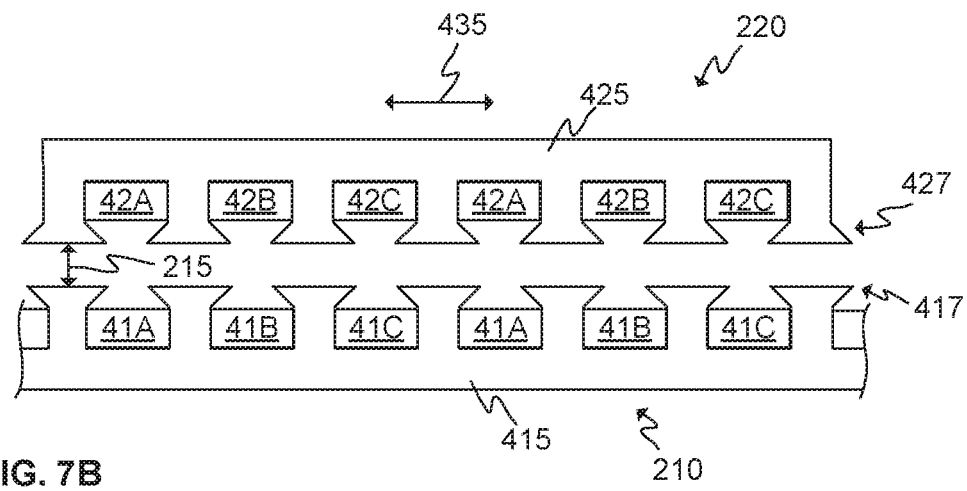

FIG. 7A illustrates schematically a wireless power transfer arrangement according to an embodiment of the present invention from a perspective view. FIG. 7B illustrates the same embodiment as in FIG. 7A from a sectional side view. In this embodiment, the windings are so called overlapping windings. This means that there may be more than one winding or coil wound around one magnetic tooth 417, 427. With overlapping windings, the windings do not have to be as exactly positioned with respect to each other in order to establish a proper inductive coupling for wireless energy transfer as in case of non-overlapping windings which require more exact positioning of the units 210, 220. Overlapping windings provide flexibility for positioning the secondary winding to face the primary winding without too severely affecting the operation of the magnetic circuit from the electrical energy transfer point of view. Overlapping windings alleviate the challenge of exact positioning between the primary and secondary winding units in wireless power transfer. It better allows power transfer on whole landing floor area, for example, within 100 millimeters from the landing floor level and, thus, the charging time of the energy storage 112 comprised in the elevator car 110 can be increased and not disturbed in case of re-levelling of the elevator car 110.

Figure 7C:
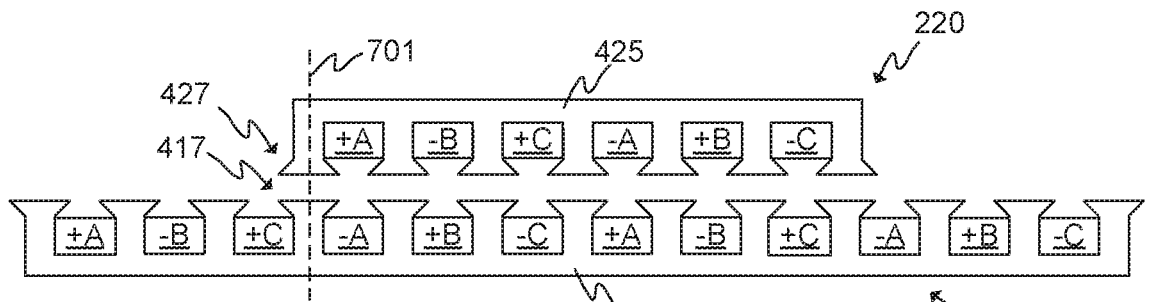
FIGS. 7C and 7D illustrate schematically a three-phase wireless power transfer arrangement according to an embodiment of the present invention.
Figure 7D:
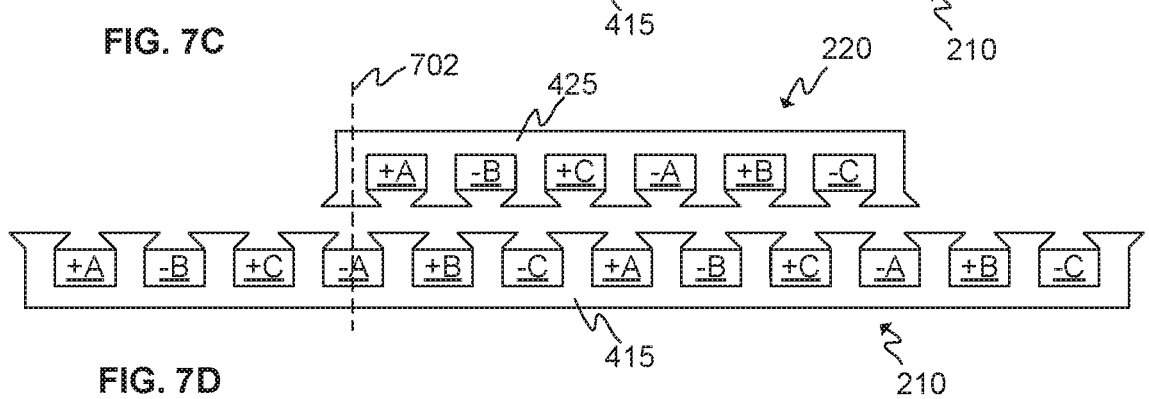

FIGS. 7C and 7D further illustrate schematically a wireless power transfer arrangement according to an embodiment of the present invention utilizing overlapping windings. In these particular cases, the primary 210 and secondary 220 winding units comprise three-phase windings, the phases of which are marked as A, B and C. Furthermore, "+A", "+B" and "+C" refer to a first direction of the current in the corresponding phase winding, whereas "−A", "−B" and "−C" refer to a second direction of the current in the corresponding phase winding, for example, +A meaning that the current in the winding of phase A is flowing away from the observer and into the surface of the figures and −A meaning that the current is flowing towards the observer and out of the surface of the figures.

In FIG. 7C, the secondary winding unit 220 is at an exact position 701 at which the secondary teeth 427 substantially face the primary teeth 417. The exact position 701 is the best position for wireless power transfer between the secondary 220 and the primary 210 windings units. FIG. 7D illustrates the same or at least similar embodiment as in FIG. 7C, however, in this case the secondary winding unit 220 is at a non-exact position 702 with respect to the primary winding unit 210 at which the secondary 427 and primary 417 teeth do not face each other exactly. However, by utilizing overlapping windings, wireless power transfer between the secondary winding unit 220 and a primary winding unit 210 is enhanced with respect to embodiments having non-overlapping windings (such as in FIGS. 6A and 6B) at non-exact positions. With overlapping windings, the wireless power transfer is possible, and enhanced with respect to embodiments having non-overlapping windings, at any position of the secondary winding unit 220 with respect to primary winding unit 210 whenever they are at a first position 250 of the elevator 100. Utilizing overlapping windings facilitates wireless power transfer, for example, during re-levelling of the elevator car 110 at the landing floor 120, if there is a part of the wireless power transfer arrangement arranged at said landing floor 120.

According to various embodiments of the present invention, the primary winding unit 210 may be part of the stator of the electric linear motor. The stator may, for example, be comprised of separate parts having windings. Thus, said separate parts which may, preferably, be independently controllable with respect to other parts of the stator, may be operated as primary windings in accordance with an embodiment of the present invention. The windings of the mover 240, if any, may then be utilized as the secondary windings in accordance with an embodiment of the present invention. Furthermore, there may be separate windings acting as the secondary windings in accordance with an embodiment of the present invention arranged to the elevator car 100 in addition to the windings configured to be in electromagnetic engagement with the windings of the stator for moving the mover, and thus the elevator car 110, along the stator.

Figure 8A:
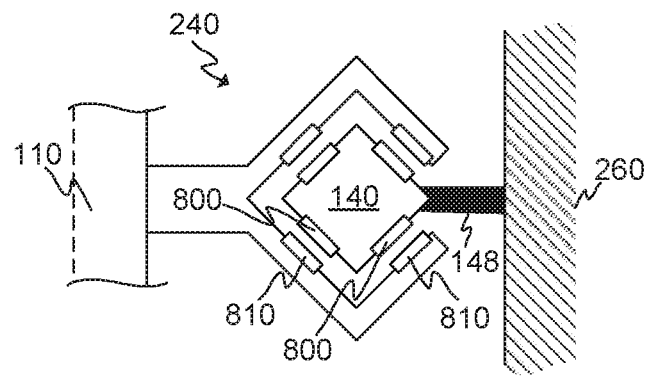
FIGS. 8A and 8B illustrate schematically an electric linear motor of the elevator according to an embodiment of the present invention.

FIG. 8A illustrates schematically a mover 240, having a C-shape, comprising units of electromagnetic components 810, such as at least windings, or coil(s), and, optionally, magnetic core with magnetic teeth, and/or permanent magnets, and a stator beam 140 comprising stators 800 according to an embodiment of the present invention. It is to be understood that there may be one or several units of electromagnetic components 810 and/or stators 800 comprised in a mover 240 and a stator beam 140, respectively. The units of electromagnetic components 810 are adapted to face the stators 800 in order to form or at least to enable forming an electromagnetic engagement between a unit of electromagnetic component 810 and a stator 800 for moving the mover 240 with respect to the stator beam 140. This entails controlling the current injected to the unit of electromagnetic components 810 of the mover 240 such as to regulate the gap between the units of electromagnetic components 810 and stator 800 when the elevator car 110 is moved along the stator beam 140 and/or when the elevator car 110 is stopped at a landing floor 120. The current injected to the units of electromagnetic components 810 may be performed and controlled by one 111 or several 111A, 111B electrical drives of the mover 240, such as frequency converter(s) or inverter(s). Separate drives 111A, 111B may be utilized for providing power to different windings 81.

Figure 8B:
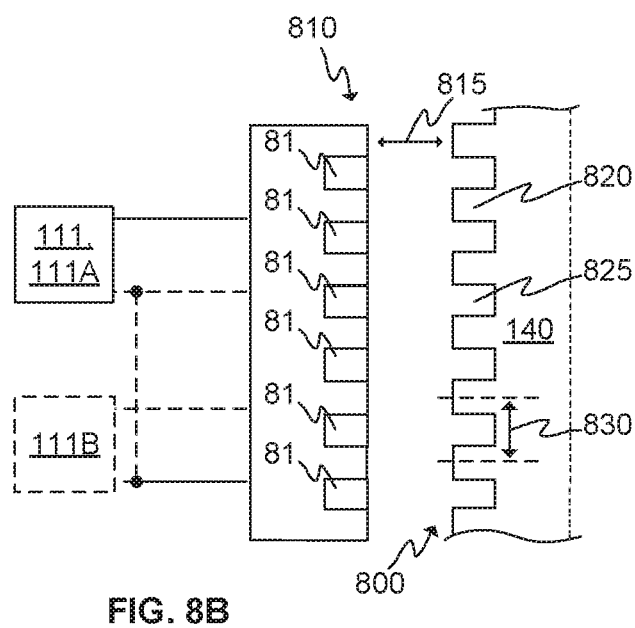

FIG. 8B further illustrates one unit of electromagnetic components 810 adapted to face one stator 800 from a sectional side view. There is a gap 815 between the units of electromagnetic components 810 and the stators 800 for enabling the movement of the mover 240 with respect to the stator beam 140. The stator beam 140 comprises one or several stators 800 that are mainly passive, that is, in the sense that they do not comprise electromagnetic components such as windings or coils which are arranged along the whole stator beam 140 and configured to generate a magnetic field for moving the mover 240 along the stator beam 140. The stator(s) 800 and their teeth are, preferably, of ferromagnetic material. The mover 240, on the other hand, comprises at least windings 81 or coils and, optionally, permanent magnets and magnetic core with magnetic teeth for producing magnetic field for engaging with the stator(s) 800 for moving the mover 240 along the stator beam 140.

In some embodiments, the magnetic core of at least primary 210 or secondary 220 winding unit, or of both, is made of electrical steel.

Figure 9A:
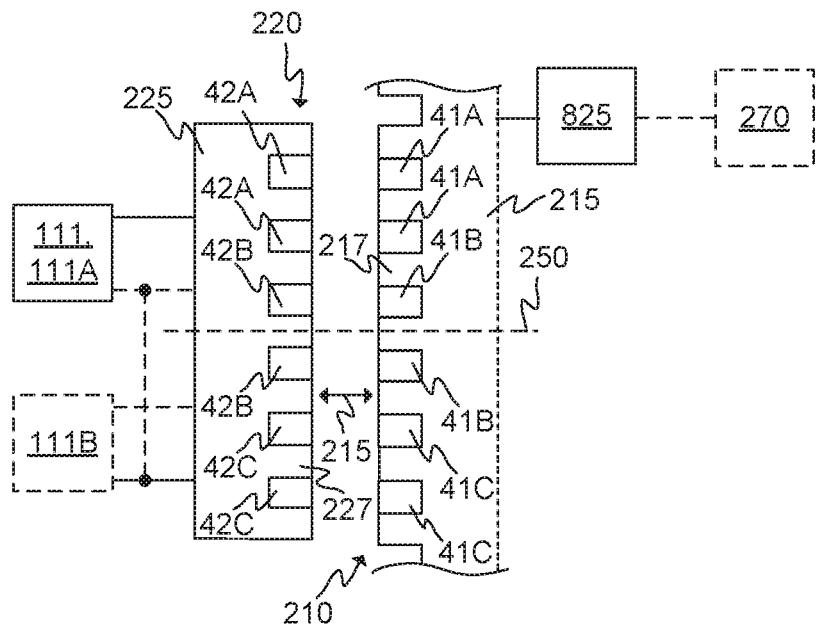
FIGS. 9A and 9B illustrate schematically wireless power transfer arrangements according to an embodiment of the present invention.
Figure 9B:
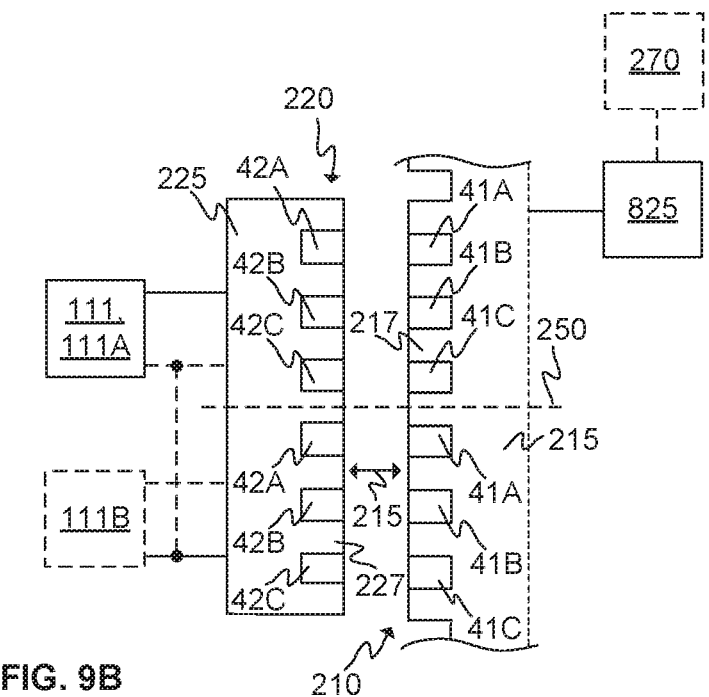

FIGS. 9A and 9B illustrate some embodiments in accordance with the present invention. The primary winding unit 210, or at least the primary windings 41, 41A-41C may be arranged to the stator beam 140 at one or several first positions 250 which are distantly arranged with respect to each other. The primary windings 41, 41A-41C may be operated by a second electrical drive 825 or drives 825. There may also be a "buffer battery", that is, a second energy storage in electrical coupling with the second electrical drive(s) 825. In FIG. 9A, the primary windings 41, 41A-41C have been arranged in non-overlapping manner as described with reference to FIGS. 6A and 6B. In FIG. 9B, the primary windings 41, 41A-41C have been arranged in overlapping manner as described with reference to FIGS. 7A and 7B. The unit(s) of electromagnetic components 810 of the mover 240 may be utilized directly as the secondary windings 42, 42A-42C. They may also be arranged in non-overlapping or overlapping manner. Preferably, the primary and secondary windings may be arranged in similar manner with respect to each other. The embodiment according FIGS. 9A and 9B advantageously removes the need for having separate secondary windings.

In embodiments according to FIG. 9A or 9B, or in similar embodiments, the primary winding units 210 may, preferably, be provided with electrical power from the main electrical power supply of the elevator 100, for example, from the electrical distribution network. In case of having a second energy storage 270, the primary winding unit 210, and primary windings 41, 41A-41C thereof, may be provided at least partly with electrical energy stored in the second energy storage 270, for example, for minimizing instant power and current peaks due to high power transfer at the charging stations, that is, at first positions 250.

Regarding utilizing the windings 81 of the mover 240, that is, windings arranged to teeth of an armature of a mover 240, as secondary windings 42, 42A-42C in accordance with the present invention, the secondary windings may be operated such that whenever the elevator car 110 is at the first position 250, the locking means, such as magnets or mechanical brakes or electromechanical brakes, keep the elevator car 110 in place while the windings of the mover 240 are non-excited and operate similarly to a secondary of a transformer, thus receiving electrical energy by magnetic induction. On the other hand, the windings of the mover 240 may be excited by the first electrical drive 111 in the elevator car 110 and the voltage level and the phase of the voltage, and thus characteristics of the current, in the primary windings 41, 41A-41C may controlled in such a way as to transfer electrical power to the secondary windings 42, 42A-42C, that is, the windings of the mover 240 in this particular case.

The length of the gap 215, that is, in the directions of the two-headed arrow associated with reference number 215, may, preferably, be from 0 to 10 millimeters. According to embodiments comprising separate primary 210 and secondary 220 winding units particularly, the length of the gap 215 may, preferably, be from 5 to 10 millimeters, thus always allowing movement of the secondary winding unit 220 with respect to a primary winding unit 210, however, the length of the gap 215 may also be less than 5 millimeters. According to embodiments comprising the primary 210 and the secondary 220 winding units integrated into parts of the electric linear motor, that is, to the mover 240 and the stator(s) 800, the length of the gap 215 may, preferably, be from 0 to 2.5 millimeters. The zero length refers, for example, to a situation where the elevator car 110 is at a landing floor 120 and the levitation of the mover 240 with respect to the stator(s) 800 has been stopped by bringing the mover 240 in contact with at least one stator 800. In this case the length of the gap 215 may is zero, however, the length of the gap 215 becomes more than zero and, preferably, up to 2.5 millimeters once the levitation of the mover 240 on the stator(s) 800 is restored before moving the elevator car 110, thus allowing the movement of the secondary winding unit 220 with respect to the primary winding unit 210.

According to one or more embodiments, the primary winding unit 210 may comprise a switching unit coupled to the primary winding 41, the switching unit having an input for receiving a power supply control signal from an elevator control unit, and the switching unit configured to provide AC voltage to the primary winding 41 on the basis of the power supply control signal.

According to one or more embodiments, the elevator 100 may comprise an elevator control unit for controlling elevator car movement and a position sensor adapted to sense position of the elevator car 110. The position sensor may, preferably, be connected to the elevator control unit. The elevator control unit may be configured to form a power supply control signal when the position sensor indicates that elevator car has arrived or is about to arrive to an intended charging position. The primary winding unit may comprise a switching unit coupled to the primary winding of the primary winding unit, the switching unit having an input for receiving a power supply control signal from the elevator control unit. The switching unit may be configured to provide AC voltage to the primary winding on the basis of the power supply control signal.

The switching unit may comprise one or more controllable switches, such as relay(s), IGBT (Insulated Gate Bipolar Transistor) transistor(s), MOSFET (Metal-oxide-semiconductor field-effect transistor) transistor(s) or corresponding.

According to an embodiment, the intended charging position may be recorded to the memory of elevator control unit. The first energy storage 112 may comprise or may be coupled to determination means for determining charging status of the first energy storage 112. The first energy storage 112 may be connected to the elevator control unit via a data link, preferably a wireless link or data wire of the travelling cable, for indicating charging need of the first energy storage 112. The elevator control unit may be configured to command elevator car 110 to stop at the intended charging position responsive to receiving a charging need, for example, a signal indicating the need for charging, or an indication of the low state-of-charge of the first energy storage 112.

The specific examples provided in the description given above should not be construed as limiting the applicability and/or the interpretation of the appended claims. Lists and groups of examples provided in the description given above are not exhaustive unless otherwise explicitly stated.

The invention claimed is:

1. A wireless power transfer arrangement for an elevator car of an elevator, the wireless power transfer arrangement comprising:
   primary winding units distantly arranged with respect to each other at first positions of an elevator shaft along which the elevator car is configured to be moved, the primary winding units including primary windings; and
   at least one secondary winding unit mounted to the elevator car, the at least one secondary winding unit including a secondary winding for establishing an inductive coupling with a respective one of the primary windings when one of the at least one secondary winding unit faces one of the primary winding units at one of the first positions at which said one of the primary winding units is arranged with a gap therebetween; and
   a first energy storage mounted to the elevator car and electrically coupled to the at least one secondary winding unit to store power for the elevator car wirelessly received through the inductive coupling, wherein
   at least one of the primary winding units and the secondary winding units include ferromagnetic teeth, around at least one of which a respective one of the primary winding and the secondary winding is wound.

2. The wireless power transfer arrangement according to claim 1, wherein at least one of the primary and secondary windings are overlapping windings.

3. The wireless power transfer arrangement according to claim 1, wherein the primary windings are arranged to a stator included in a stator beam of an electric linear motor of the elevator.

4. The wireless power transfer arrangement according to claim 1, wherein the secondary winding is arranged to a mover of an electric linear motor of the elevator.

5. A wireless power transfer arrangement for an elevator car of an elevator, the wireless power transfer arrangement comprising:
   primary winding units distantly arranged with respect to each other at first positions of an elevator shaft along which the elevator car is configured to be moved, the primary winding units including primary windings; and
   at least one secondary winding unit mounted to the elevator car, the at least one secondary winding unit including a secondary winding for establishing an inductive coupling with a respective one of the primary windings when one of the at least one secondary winding unit faces one of the primary winding units at one of the first positions at which said one of the primary winding units is arranged with a gap therebetween, wherein
   the distantly arranged primary winding units are galvanically separated from each other and have a distance of at least one meter between two consecutive primary winding units.

6. The wireless power transfer arrangement according to claim 1, wherein each one of the primary winding units comprises:
   a second energy storage configured to provide electrical energy stored therein to a respective one of the primary winding units to reduce instant power and current peaks.

7. An elevator comprising:
   an elevator car configured to move in an elevator shaft;
   at least two primary winding units located at respective ones of at least two distantly arranged first positions of the elevator shaft, the at least two primary winding units include primary windings;
   at least one secondary winding unit mounted to the elevator car, the at least one secondary winding unit includes a secondary winding for establishing an inductive coupling with a respective one of the primary windings for wireless electrical power transfer when one of the at least one secondary winding unit faces one of the primary winding units with a gap therebetween when the elevator car is arranged at one of the at least one first positions; and
   a first energy storage mounted to the elevator car and electrically coupled to the at least one secondary winding unit to store power for the elevator car wirelessly received through the inductive coupling, wherein
   at least one of the primary winding units and the secondary winding units include ferromagnetic teeth, around at least one of which a respective one of the primary winding and the secondary winding is wound.

8. An elevator comprising:
an elevator car configured to move in an elevator shaft;
at least two primary winding units located at respective ones of at least two distantly arranged first positions of the elevator shaft, the at least two primary winding units include primary windings; and
at least one secondary winding unit mounted to the elevator car, the at least one secondary winding unit includes a secondary winding for establishing an inductive coupling with a respective one of the primary windings for wireless electrical power transfer when one of the at least one secondary winding unit faces one of the primary winding units with a gap therebetween when the elevator car is arranged at one of the at least one first positions, wherein
the primary winding units are galvanically separated with respect to each other and have a distance of at least one meter between two consecutive primary winding units.

9. The elevator according to claim 7, wherein the primary and secondary windings are overlapping windings.

10. The elevator according to claim 7, wherein the primary winding are arranged to a stator included in a stator beam of an electric linear motor of the elevator.

11. The elevator according to claim 7, wherein the secondary winding are arranged to a mover of an electric linear motor of the elevator.

12. The elevator according to claim 7, wherein each one of the primary winding units comprises:
a second energy storage configured to provide electrical energy stored therein to a respective one of the primary winding units to reduce instant power and current peaks.

13. The elevator according to claim 7, wherein the primary winding unit includes a switching unit coupled to the primary winding, the switching unit configured to provide AC voltage to the primary winding in response to a power supply control signal, wherein the elevator further comprises:
a position sensor configured to sense a position of the elevator car, the position sensor being connected to the elevator controller; and
an elevator controller configured to control movement of the elevator car, and to generate the power supply control signal when the position sensor indicates that the elevator car is arriving at one of the first positions.

* * * * *